United States Patent [19]

Ball

[11] 4,049,929
[45] Sept. 20, 1977

[54] APPARATUS FOR REDUCING THE SUSCEPTIBILITY OF LINE SIGNAL REPEATERS TO INDUCED CURRENTS

[75] Inventor: Edward Thomas Ball, Coquitlam, Canada

[73] Assignee: GTE Lenkurt Electric (Canada) Ltd., Burnaby, Canada

[21] Appl. No.: 751,128

[22] Filed: Dec. 16, 1976

[51] Int. Cl.² .............................................. H04B 3/44
[52] U.S. Cl. ............................... 179/170 J; 179/170 R
[58] Field of Search .................. 179/77, 81 R, 170 R, 179/170 J, 184, 2.5 R, 16 A, 16 AA, 16 F, 170 T, 170 HF, 170 NC

[56] References Cited
U.S. PATENT DOCUMENTS

| | | | |
|---|---|---|---|
| 3,181,033 | 4/1965 | Bakker | 179/184 |
| 3,742,450 | 6/1973 | Weller | 179/170 J |
| 3,800,095 | 3/1974 | Cowpland | 179/77 |

Primary Examiner—Kathleen H. Claffy
Assistant Examiner—Randall P. Myers
Attorney, Agent, or Firm—Douglas M. Gilbert

[57] ABSTRACT

Apparatus for reducing the susceptibility of line signal repeaters to induced currents includes a zener diode/diode stack which provides the line repeater with a constant voltage drop when the DC line current is above the minimum required bias current. When the DC input current plus an induced component from the line exceed the load requirements of the repeater, the excess current is conducted through a blocking diode to charge an energy storage device. But, when the DC input current and the induced component oppose each other, the energy stored in the energy storage device is used to supplement the input current to just maintain the required repeater voltage.

9 Claims, 1 Drawing Figure

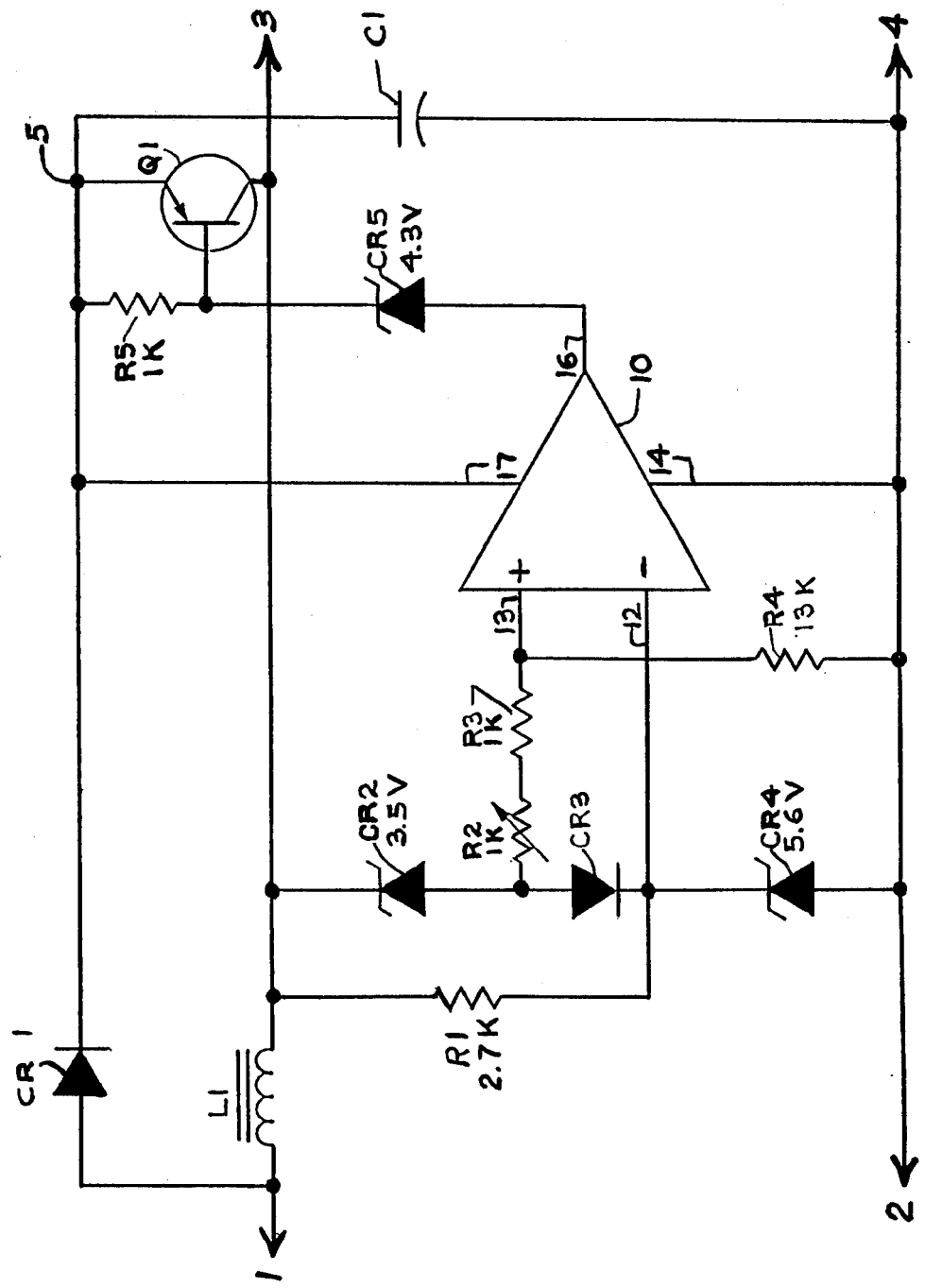

APPARATUS FOR REDUCING THE SUSCEPTIBILITY OF LINE SIGNAL REPEATERS TO INDUCED CURRENTS

BACKGROUND OF THE INVENTION

This invention pertains generally to the field of telecommunications and more particularly to repeated carrier systems, such as pulse code modulation (PMC) systems using a transmission cable pair as the transmission medium. The repeaters for such systems are usually powered via the transmission cable pair from a central office where the terminal equipment is located. A simplex power loop is usually provided at the repeater since the simplex power loop is a most attractive method for providing power to a signal line repeater. For a discussion and an illustration of a simplex power loop refer to "Bipolar Repeater for PCM Signals" by J.S. Mayo, *Bell System Technical Journal*, Janauary 1962, pages 73–76.

A transmission cable pair (hereinafter referred to as a signal line) with exposure to AC power transmission lines is susceptible to induced longitudinal AC currents. These induced currents potentially can cause transmission impairment with the communication signals and interference with the DC power feed to the signal repeaters installed along the signal line. The effect of the induced AC currents upon the simplex power loop is to cause the DC current in the simplex power loop (hereinafter referred to as line current) to be amplitude modulated usually at the power line frequency of 60 Hz. The induced AC modulation causes the instantaneous line current to vary above and below some nominal level. When the instantaneous line current is above the minimum level necessary to power the repeater, the excess power is usually converted into heat primarily in the signal line by the action of the voltage control circuitry within the repeaters. However, when the instantaneous line current is below the minimum level necessary for operation of the repeater, the repeater is starved for power and fails to perform properly.

The reduction of interference to the DC line current has usually been treated on a case by case basis using various techniques. One approach to the problem cancels the induced current by adding an opposing AC signal into the simplex power loop circuit at the end office repeater. Another method increases the available current margin by increasing the DC line current so that the minimum DC line current is adequate even when modulated by the induced AC current. Still another method is to reduce the DC current requirements of the signal repeater, which also increases the available current margin.

SUMMARY OF INVENTION

Accordingly the present invention provides apparatus for improving the AC immunity of signal repeaters (i.e. the susceptibility of the repeater to AC currents). The signal line, providing power to the repeater connects to the apparatus at first and second input terminals. Third and fourth output terminals connect to the signal repeater, with the fourth terminal being common with the second terminal. An impedance device connected between the first and third terminals offers an impedance to any AC signal applied thereto. A voltage regulating means establishes the voltage across the output terminals at a substantially constant level so long as the current through the regulating means exceeds a predetermined minimum level. The voltage regulating means also provides a control output signal indicative of any change in voltage drop across the voltage regulating means. An energy storage device is connected across the fourth terminal and a fifth terminal. A rectifier, connected across the first and fifth terminals, permits the energy storage device to become charged when the potential across the input terminals exceeds, by a predetermined amount, the potential across the fourth and fifth terminals. And, when the potential across the input terminals is less than the voltage across the fourth and fifth terminals, the rectifier blocks the flow of energy out of the energy storage device to the signal line. A gating means is connected across the third and fifth terminals, and it is responsive to the control signal from the voltage regulating means. The gating means controls the rate of energy discharged from said energy storage device to said third terminal, thereby enabling the voltage across said third and fourth terminals to remain substantially constant despite induced AC currents applied to said first terminal via the signal line. Thus the current in the energy storage device supplements the input line current during brief periods when the sum of the DC input current and the induced AC current are insufficient to power the signal repeater.

BRIEF DESCRIPTION OF THE DRAWING

The single FIGURE is a schematic diagram of one embodiment of this invention.

DETAILED DESCRIPTION

Broadly, the particular embodiment shown in the FIGURE interconnects between a signal line repeater and the signal line. With reference to this FIGURE, there is shown a pair of input terminals 1 and 2, and pair of output terminals 3 and 4. Input terminals 1 and 2 connect to the signal line (not shown) to receive an input current i.e. the line current which energizes the signal repeater. Input terminals 1 and 2 connect to the signal line such that the polarity of terminal 1 is positive with respect to terminal 2. Output terminals 3 and 4 connect to the power input connections of the signal repeater (not shown) with terminal 3 being positive with respect to terminal 4. As shown in the FIGURE, terminals 2 and 4 are common with each other.

Inductor L1, which offers an AC impedance to the line, connects across input terminal 1 and an output lead which eventually connects to terminal 3. Inductor L1 in one embodiment, was designed to have an impedance of approximately 50 ohms at 60 Hz-60 Hz being the most probable frequency of AC interference. The particular value of inductor L1 depends upon several factors such as the frequency and magnitude of the interference expected. In operation L1 conducts the DC input current to a voltage regulating means which includes a zener diode/diode stack CR2, CR3, and CR4. Resistors R1 through R4 provide the zener diodes with sufficient bias current to assure proper zener operation. The zener diode/diode stack in combination with the resistive biasing network provide a constant voltage drop across output terminals 3 and 4 and hence to the line repeater operationally connected thereto. The remainder of the circuit components play a passive role in normal operation until a large AC current is superimposed on the DC input current. A voltage sensitive device, shown as DC amplifier 10, connects across diode CR3 via bias resistors R2 and R3. The value of variable resistor R2 is initially adjusted so that the potential on lead 13 is slightly more positive than the potential on lead 12 to ensure that the output voltage on lead 16 is approximately that on lead 17. Leads 17 and 14 provide the energizing potential required by amplifier 10. The amplifier output signal on lead 16 is a control signal indicative of any change in voltage across CR3. And, as will be seen, any change in voltage across the voltage regulating means is reflected entirely across diode CR3. Therefore, output signal on lead 16 is also indicative of any change in voltage across the entire zener diode/diode stack.

The amplifier output lead 16 connects to a gating circuit which includes zener diode CR5, resistor R5, and transistor Q1. Transistor Q1 acts as an on/off gate. In the on state Q1 provides a conductive path from terminal 5 to terminal 3. Resistor R5, connected across the base-emitter junction of Q1, is simply a bias resistor for transistor Q1. Connected to the emitter circuit is a diode CR1 which is oriented to permit current flow in the direction from terminal 1 to terminal 5. Capacitor C1, used as an energy storage device, connects across terminals 4 and 5 with terminal 5 being positive with respect to terminal 4. The energy storage device receives a charge through diode CR1 when said diode is in a conductive state.

Functionally the circuit shown in the FIGURE operates as follows. Assuming first that there is no induced AC current component on the signal line, the input current enters at terminal 1 and is conducted through inductor L1. A small portion of this input current goes to bias the voltage regulating means, and the remainder is conducted through to the output terminals and the repeater load. Diode CR3, biased in its active region, has approximately a 0.7V drop-assuming a silicon device. The voltage on output lead 16 is approximately the same as the voltage on the amplifier lead 17 with 0.7V across CR3. Consequently, there is very little voltage drop across CR5 and R5, the base-emitter junction of Q1 is reversed biased, Q1 is held off. Diode CR1 is in a conducting state charging capacitor C1 to the voltage drop across the voltage regulating means less the junction drop of CR1.

Assuming now that an AC signal large enough to otherwise cause a repeater malfunction, is imposed upon the signal line, the circuit functions somewhat differently. Inducter L1 and the zener diode/diode stack form an AC voltage divider to reduce the voltage fluctuations seen across terminals 3 and 4. But more importantly L1 offers a high AC impedance relative to the impedance of CR2, CR3, and CR4, so that the energy in the line fluctuations can be put to useful work. When the AC & DC current components have the same polarity, the instantaneous voltage drop across the output terminals 1 and 2 increases, and diode CR1 conducts to charge C1 to the higher voltage level. When the input voltage reaches a peak and then starts decreasing, CR1 becomes reversed biased and blocks any discharge from C1 back to the line circuit. As the AC current continues to reverse polarity, the input voltage decreases below the nominal DC voltage level. The voltage across the zener diode/diode stack simultaneously decreases. As this happens the voltage drop across CR3 decreases. Since CR2 and CR4 are biased independently of the series to current through the three diodes, the decrease in voltage that occurs across the voltage regulating means is completely reflected across diode CR3. As the voltage across CR3 decreases, the voltage on lead 13 becomes more negative than the voltage on lead 12. This voltage difference is amplified by amplifier 10, and the output voltage on lead 16 decreases towards the voltage on lead 14. When the voltage goes sufficiently negative (with respect to the voltage on terminal 5) current flows through resistor R5. Eventually the voltage drop across R5 becomes great enough to forward bias the base-emitter junction of transistor Q1. This then provides a conductive path, emitter-to-collector, for the energy stored across C1. The energy discharged of C1 is controlled so that the energy returned to bias the voltage control means is just enough to maintain the desired voltage across output terminals 3 and 4. As the AC current polarity again reverses, input voltage across terminals 1 and 2 rises, Q1 is turned off, and capacitor C1 begins charging through diode CR1 so that the process may be repeated.

Although Q1 is referred to above as a gating circuit, transistor Q1 cannot be operated in a hard on/off mode without some delay of the discharge of C1. If Q1 were placed in saturation, the charge across C1 would dissipate in a matter of microseconds through the zener diode/diode stack. The charge across C1 should be released in a controlled manner to just maintain the output voltage (across terminals 3 and 4) at the desired level. The particular embodiment shown in the FIGURE produces such a controlled release of energy.

While there has been shown and described what is considered at present to be the preferred embodiment of the invention, modifications thereto will readily occur to those skilled in related arts. For example, a single zener diode could be used as the voltage regulator in place of CR2, CR3, and CR4. A suitable resistive bias network could be used in conjuction with amplifier 10 to provide a suitable input voltage to amplifier 10. Furthermore, a transistor differential amplifier could be used equally well as the operational amplifier 10. Another obvious modification would be to replace the zener diode with a series string of silicon junction diodes having the same voltage drop as the single zener diodes.

What is claimed is,

1. In a telecommunication system having at least one signal repeater, apparatus for reducing the susceptibility of said repeater to induced currents in said signal line comprising:
   an input circuit including first and second input terminals, said input circuit when coupled to said line receiving an input current having a DC and an induced AC component;
   an output circuit including third and fourth output terminals, said output circuit when coupled to said repeater supplying load current thereto, said fourth terminal being common with said second terminal;
   impedance means connected between said first and third terminals, said impedance means for receiving said input current and for supplying said load current and bias current;
   a fifth terminal;
   energy storage means connected across said fourth and fifth terminals;
   rectifying means connected across said first and fifth terminals, said rectifying means being conductive when said DC and AC current components are of the same polarity and said means being nonconductive when said DC and AC current components have opposite polarity, said rectifying means thereby permitting said AC current component to charge said energy storage device when said DC and AC current components have the same polarity;

voltage regulating means connected across said fourth terminal and the junction of said impedance means and said third terminal, said regulating means responding to said bias current to produce a constant voltage across said third and fourth terminals so long as said bias current exceeds a predetermined minimum, and causing said constant voltage to decrease when said bias current falls below said minimum, said regulating means also providing a control output signal indicative of any decrease in voltage across said regulating means; and gating means connected across said third and fifth terminals and responsive to said control output signal, said gating means being non-conductive when said DC and AC input current components are of the same polarity and being conductive when said input current components are of opposite polarity, said means thereby controlling the rate of energy discharge from said energy storage means to said output circuit and causing the energy in said energy storage means to supplement said input current when said AC and DC current components are of opposite polarity.

2. Apparatus as in claim 1 wherein said voltage regulating means comprises:

diode means, including at least one zener diode, connected across said fourth terminal and the junction of said impedance means and said third terminal; and voltage sensing means connected across said diode means and providing said control output signal.

3. Apparatus as in claim 1 wherein said voltage regulating means comprises:

diode means, including a plurality of diodes, connected across said fourth terminal and the junction of said impedance means and said third terminal; and voltage sensing means connected across said diode means and providing said control output signal.

4. Apparatus as in claim 2 wherein said energy storage means comprises a capacitor.

5. Apparatus as in claim 4 wherein said impedance means comprises an inductor.

6. Apparatus as in claim 5 wherein said rectifying means comprises a first diode.

7. Apparatus as in claim 6 wherein said diode means further comprises:

a first zener diode;

a second diode;

a second diode, said second diode and said first and second zener diodes connected in series across said fourth terminal and the junction of said impedance means and said third terminal, said second diode being connected between said first and second zener diode; and resistive means for supplying to said zener diodes said bias current.

8. Apparatus as in claim 7 wherein said voltage sensing means further comprises a DC voltage amplifier.

9. Apparatus as in claim 8 wherein said input circuit is coupled to a signal line in a simplex loop configuration.

* * * * *